United States Patent
Jager et al.

(10) Patent No.: US 8,688,319 B2
(45) Date of Patent: Apr. 1, 2014

(54) PROCEDURE FOR ADAPTIVE CONFIGURATION RECOGNITION

(75) Inventors: Thomas Jager, Meckenbeuren (DE); Mario Kaller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1583 days.

(21) Appl. No.: 12/041,046

(22) Filed: Mar. 3, 2008

(65) Prior Publication Data

US 2008/0221752 A1    Sep. 11, 2008

(30) Foreign Application Priority Data

Mar. 6, 2007  (DE) .......................... 10 2007 010 763

(51) Int. Cl.
| G06F 17/00 | (2006.01) |
| G06F 19/00 | (2011.01) |
| B60L 1/00 | (2006.01) |
| G01M 17/00 | (2006.01) |

(52) U.S. Cl.
USPC .......... 701/36; 701/29.1; 701/29.6; 701/32.7; 340/10.1

(58) Field of Classification Search
USPC ............ 701/1, 29, 31, 32, 35, 36, 29.1, 29.6, 701/30.8, 32.6, 32.7; 340/425.5, 426.1, 340/426.11, 426.14; 307/9.1, 10.1, 10.2
See application file for complete search history.

(56) References Cited

U.S. PATENT DOCUMENTS

| 5,416,781 | A | * | 5/1995 | Ruiz .............................. 370/524 |
| 5,493,727 | A |   | 2/1996 | Ohya |
| 5,521,588 | A |   | 5/1996 | Kuhner et al. |
| 5,822,580 | A | * | 10/1998 | Leung ............................ 717/164 |
| 5,931,938 | A | * | 8/1999 | Drogichen et al. ............. 712/15 |
| 6,747,366 | B2 |  | 6/2004 | Juntunen et al. |
| 7,039,511 | B1 |  | 5/2006 | Kreuz et al. |
| 2002/0016652 | A1 | | 2/2002 | Heckmann et al. |
| 2002/0035428 | A1 | | 3/2002 | Baeuerle |
| 2004/0015272 | A1 | | 1/2004 | Vollmer et al. |
| 2004/0060751 | A1 | | 4/2004 | Frank |
| 2004/0260751 | A1 | | 12/2004 | Schloesser |
| 2008/0270427 | A1 | | 10/2008 | Franke et al. |

FOREIGN PATENT DOCUMENTS

| DE | 43 15 494 C1 | 9/1994 |
| DE | 199 26 206 A1 | 1/2001 |
| DE | 100 23 703 A1 | 11/2001 |
| DE | 100 27 006 A1 | 12/2001 |
| DE | 100 30 987 A1 | 1/2002 |
| DE | 103 18 470 A1 | 7/2004 |
| DE | 10 2004 055 875 A1 | 5/2006 |
| DE | 10 2005 013 285 A1 | 5/2006 |
| WO | WO-00/77620 A2 | 12/2000 |
| WO | WO-2004/053602 A1 | 6/2004 |

* cited by examiner

Primary Examiner — Thomas Tarcza
Assistant Examiner — Edward Pipala
(74) Attorney, Agent, or Firm — Davis & Bujold, PLLC; Michael J. Bujold

(57) ABSTRACT

The invention involves a procedure for adaptive configuration recognition after the run-up of a control device with or without configuration storage, which performs an automatic and operator-assisted, optimal configuration of the operating software of a motor vehicle.
In a first variant, a central control device, after its run-up, receives at the earliest possible time, as a rule after activation of the ignition, identifying information from other components connected directly or indirectly to the central control device by data link. Upon receipt of the identifying information of a component, the central control device assumes that this component is present. Otherwise it assumes that it is not present. An additional configuration memory area is envisioned in a second variant in which the central control device, after the first receipt of the identifying information of a component, stores either the information, the associated software parts, or the software configuration resulting from the total of the recognized components. In this way, the appropriate software configuration can be quickly made available upon the new start of the vehicle with an unchanged hardware configuration. Furthermore, the procedure facilitates a guarantee that no error reports will be generated about components that are not present.

15 Claims, 2 Drawing Sheets

PROCEDURE FOR ADAPTIVE CONFIGURATION RECOGNITION

This application claims priority from German Application Serial No. 10 2007 010 763.5 filed Mar. 6, 2007.

FIELD OF THE INVENTION

This invention involves a procedure for adaptive configuration recognition after the run-up of a control device of a motor vehicle.

BACKGROUND OF THE INVENTION

Motor vehicles are increasingly being equipped with many complex electrical and electronic devices and functions. In place of a mechanically and/or manually activated actuator for operating the basic functions of the vehicle, there are a variety of control devices for monitoring and influencing certain components or functions of the vehicle in a typical modern motor vehicle. To do this, it is necessary for the different control devices to exchange data with each other.

Thus there are at least one motor control device, a transmission control device and other control devices involved in the control of a drivetrain of a vehicle which, for example, improve tracking in critical driving situations by specific braking interventions or can minimize the stopping distance by way of an ABS control (ABS=anti-lock braking system). At the same time the number of additional systems such as navigation and communication systems, in the vehicle and their networking to each other increases, which poses a variety of compatibility problems.

Because of the large number of different equipment variations in a vehicle from the production plant, the configuration of the control devices and the hardware components associated with them, like actuators, sensors and other control devices, represent a significant problem in the construction and design of a motor vehicle. To solve these difficulties, it is known to tune the software of a vehicle to the vehicle-specific combinations. The programming of the control devices tuned to the specific vehicle usually occurs at the end of manufacture of the vehicle and can only be changed with a lot of time and effort since, with reprogramming, the compatibility of all components and control devices in the vehicle must be verified.

Thus a procedure is known, for example, from US 2004/0260751 A1 where, in the context of a visit to a repair shop the configuration of the vehicle's built-in hardware as well as the currently stored software can be read-out in order to ensure that, in the event of any necessary change or expansion of the software, only those software modules that have been tested and released for the configuration in question will be installed. Such a procedure is only for cases in which a refitting of the vehicle is the exception and, if necessary, will take place only a few times during the life span of a vehicle, since the hardware modifications in question usually take place in a specialty repair shop. It is a disadvantage, however, that the software changes must be performed separately thereby increasing costs.

U.S. Pat. No. 6,747,366 B2 discloses a similar procedure for a power supply system of a vehicle which includes a number of intelligent network nodes, each with an internal memory for configuration data. These are read-out by an adapter when the vehicle starts and is stored in a separate memory component. At periodic intervals, the adapter checks the matching of the configuration data of the network nodes with the data stored in its own memory component. If these data do not match a network node, for example because the network node has been replaced and has no configuration data stored in it, the adapter conveys the configuration data stored in its own memory component for this network node to the internal memory, thereby configuring the new network node without any outside intervention being necessary. New configuration data can be written into the memory component of the adapter via a service interface. During the next comparison of the data stored there with the data in the network nodes, the latter are updated by being overwritten with the former and the system is updated.

This system indeed offers advantages, if only one component must be exchanged for an equal or even a fully compatible component. On the other hand, it does not offer any advantages with regard to a fast and automatic adaptation of the software configuration which depends on a hardware configuration that is present, since in the event of a component replacement, the current software parts must be externally placed in the memory component of the adapter. In addition, a failure or removal of a node is first determined during a periodic check.

A system with an external check of the hardware and software is not practical for vehicles that must be re-equipped periodically or even frequently and routinely. Thus it is the usual practice for work vehicles to attach various components to a vehicle. For example, in the case of a road maintenance vehicle there has to be the capability, depending upon the weather, of quickly and simply changing between a snow plow, a snow blower and a brush roller, where alternatively or simultaneously grit conveyors or grit distribution systems can be used. In the summer months, the same vehicle is to alternatively be used as a mowing vehicle or as a vehicle for cleaning street markings and guard rails or is operated with other work equipment. The conversion is done locally at the highway department without any visit to a workshop. An external reprogramming of control equipment after each conversion is neither practical nor justifiable, since the conversion times are to be kept as short as possible especially with regard to clearing operations. The same is true, for example, for vehicles used in agriculture, fire departments and technical assistance services.

As an alternative to the previously described possibility of an individually tuned programming of the control devices, it is known to provide vehicle control devices with a memory element in which not only the currently needed software configuration for the current vehicle configuration is stored, but also alternative configurations. Known from WO 00/77620 A2 is a computerized network system for a vehicle in which the individual components are connected via a network and which enables a simple reconfiguration, as well as an upgrade of the vehicle. If a component is connected to the network where a special "discovery and join" protocol governs, it automatically registers with the network server and is integrated into the network whereupon other components search the network server for new functions which the newly attached components possibly make available. The components to be installed can contain a memory in which information about the executable functions and functions required by other components are stored. In this, the registration must be repeated within certain time periods. On the other hand, the system assumes that the associated component is again removed and erases the associated information.

The result is that the repeating of the registration must take place within very short time intervals and with corresponding greater stress on the entire system or the user runs the risk that after the deactivation of a component the vehicle will operate for a certain time without a current software configuration.

This is not only disadvantageous, but can also result in serious malfunctions or at least an unjustified error reporting, because of the various reciprocal effects between different hardware and software components. Furthermore, it is not guaranteed that differentiation can be made between the intended removal of a component and a failure of the component.

The German patent DE 199 26 206 C2 discloses a vehicle electric configuration system for the automatic configuration of vehicular electrical systems in which the attached hardware components, which are attached at least partially to a data bus network, incorporate at least in part implemented software components to perform associated functions. Furthermore, a vehicle-related, central, actual configuration data memory for the retrievable application of a current configuration fitting the respective vehicle is envisioned.

In the case of a replacement, an upgrade or a new installation of a component the previous actual configuration can thus be retrieved in a simple manner and updated, if need be. To do this, all partial systems of the vehicle electric arrangement can be acquired with their associated component relationships by the system developer. In order to be certain that the actual configuration does, in fact, depict the current, actually available system, it is envisioned that each control device component is able to identify itself. Since the data read by the hardware components contain, in addition to internal details and the actually implemented software of the components, also data about attachable actuators and sensors, as well as possible and usable resources, like power cables, connections, bus identifiers, memory areas and CPU usage, a check of the compatibility of replacement parts can be performed with their help using the available hardware and software. In any event, required for a component replacement or a component upgrade is the use of a system user which identifies the appropriate component in the configuration.

The system is thus not able to react in a fully automatic manner to an upgrade, a conversion or another change in the configuration. To be sure, a vehicular electric configuration means is claimed in Claim 5 of this document, which envisions a reconfiguration means for a computer-supported, automatic reconfiguration of a vehicular electric arrangement upon the replacement of at least one component with at least one new component of a corresponding function or another type or the addition of at least an additional component for a new functionality or, in the event of a change, at least a component relationship. However, this involves a menu-supported program in which the determination of the actual configuration occurs only in a fully automatic manner after the manual input of data. The solution of DE 199 26 206 C2 also is not suited for the fastest possible updating of the software-related, current configuration independent of the driver/operator.

A control device for the operation of a deployment vehicle is known from WO 2004/053602 A1, in particular a fire truck and additional components either integrated into or externally operable with the deployment vehicle. It includes a configuration unit which has a communication linkage with a computer device placed in an electronic module. Software functions are stored in a memory device which can be associated with the connection contacts of the input and output interfaces of the electronic module. The configuration unit is associated with at least one input unit and a display device. However, this does not involve a fully automatic system, but only an improved access possibility for the electronic modules of the individual systems that can be programmed or configured in this manner.

Finally, a procedure is known from DE 10 2004 055 875 A1 for the application-specific configuration of software. Selected from a quantity of several application-specific software parts is a subset, which is deposited in compiled form in a control device. Variables are assigned to these selected software parts. For example, the software can consist of a control of driving dynamics consisting of three different parts to which the variables A, B and C are assigned. In a vehicle, which can selectively make a front wheel drive or an all wheel drive available, it is then possible to block a software part C for a rear wheel drive by setting a parameter so that it cannot be loaded into the control. The other two software parts A and B are conveyed to the control unit. Depending on the actual application case, in this case whether the driver activates a front wheel drive or an all wheel drive, the applicable software part A or B is compiled and is made available to the control unit.

This procedure, to be sure, facilitates the selective use of a component in various software modes, but it does not provide any indication of an integration of a replaced or added component into the system or the recognition of a configuration after the disassembly or addition of a component.

It is, however, desirable in vehicles and in particular commercial vehicles, that the configuration can be changed, especially in relation to the re-equipping or removal of hardware components during the useful life of the vehicle, without an external system having to be connected or a new configuration of the system being required by an operator.

It is thus desirable in trucks, for example, if a vehicle ordered without a retarder, a hub drive or an ASR (automatic slippage regulator) can be retrofitted quickly and at a reasonable cost, when needed. This, however, assumes the subsequent integration of the control device of the retarder, the hub drive and/or a change of the software or the parameters for operation, e.g., of the motor control system, and therefore often causes a costly new programming of other control devices or even an exchange of the central control device.

While it is basically known from DE 10 2004 055 875 A1 how to program a single software for various variations of a motor vehicle, from which the actual configuration of the parts pertaining to the vehicle is selected, a practical procedure has been missing up to now for reliably determining the actual hardware configuration such that, after the run-up of a control device of a vehicle, the actual configuration is known and the pertinent software configuration is set.

Against this background, the invention has the task of introducing a procedure for an adaptive configuration recognition that, directly after the start or run-up of a control device, recognizes which components and/or functions are actually present in or on the vehicle and which can be automatically adapted to the software configuration of the vehicle and/or the error management system.

SUMMARY OF THE INVENTION

The invention is based on the knowledge that the hardware configuration of a vehicle can be advantageously determined at a late point in time but at the latest immediately before use. After determination of the hardware configuration and/or the implemented functional scope, a control unit with an appropriate design of the system can conduct the software configuration of the system with little effort, in that a suitable software module is activated and unneeded or even incompatible software parts are turned off or not even loaded.

Accordingly, the invention emanates from a procedure for the adaptive configuration recognition of a vehicle, which possesses at least a central control unit that is connected via a data line with at least one additional component and which is further connected with at least one data memory unit in which the software to operate at least one central control device is securely stored against an unintended loss.

In the simplest case, the central control unit is thereby a control unit whose mission is to check the current configuration of the vehicle. Alternatively, however, other control units can, alone or collectively, assume the function of the central control unit or the latter can be physically integrated into one or several other control devices.

Understood under the concept of other components and in the following are other control devices and aggregates and components, as well as implemented or approved functions. It is possible that certain functions are basically installed in a control device, but are made available, for example, only after activation which is subject to a fee or after a certain minimum outfitting of the vehicle. In this case, the functions are considered available only when they are actually able to be used, for example, activated.

A preferred permanent, data memory can be integrated into the central control device or into another control device, or can be constructed as a stand-alone unit. It includes at least the data that are necessary in order to start the procedure introduced here and to schedule the call-up of the other required data.

In order to solve the assigned task, it is envisioned in conjunction with the named characteristics of the chief concept of the main claim that the central control device receives, as early as possible after run-up, the identifying information from the other components connected via direct or indirect data links with the central control device and upon receipt of information identifying a component thereupon concludes that this additional component is present, and then loads suitable parts of the software required for the operation of the vehicle along with other components from the data memory into an operational data memory.

As a rule, more than one component will be present where, in this regard, it cannot be concluded in what manner the central control device receives its data. In practice, it is customary for a transmission control device to simultaneously function as a clutch control device or in any event to be connected with its activation actuator by way of a direct control link. In addition, the control of a retarder—in so far as present—can also occur by way of this control device. Thus the transmission and clutch control device is able to transmit to the central control device data about its own identity as well as the attached transmission and, if applicable, the clutch control device, the clutch and, if applicable, the retarder.

Alternatively or in addition, an explicit query of all component control devices connected with the central control device is possible. Likewise, in the context of the invention, it does not depend upon whether the central control device actively queries about the identifying information of a component, passively receives it or infers it from other data. It is thereby essential only that, immediately after the run-up of the central control device, in other words after it attains its full functional capability, a query occurs at the end of which information is present in the central control device about the momentary actual hardware and, if applicable, software configuration of the vehicle.

The run-up of the central control device usually occurs directly after starting the ignition or after the start of the vehicle where, at the earliest possible point in time current data is available about the components built into the vehicle or attached to it. Implicitly understood here in the sense of the invention is the fact that information about certain components can only be available after several seconds, because of a longer lasting run-up procedure of a certain component control due to the software.

It should be pointed out that the concept of software should be understood in a broad sense and can naturally include, in addition to programs and program parts in an executable, de-compiled or otherwise encoded form, characteristic lines, characteristic diagrams, protocols, operating systems, structural data on neuronal networks or other items which are accessible to electronic data processing.

Finally, the operational data memory can be a single, physical memory or a memory distributed over a number of physical units. Thereby, it does not depend on whether the data present in the operational data memory is used directly to execute functions. Especially during time-critical applications and with the use of a central operational data memory, it makes more sense for the executing components or computer units to use a local, e.g., copy, of the required data. Alternatively, however, the operational data memory can consist of a variety of memory units organized in a decentralized manner, which form the operational data memory only when viewed in their totality. The decentralized memory units are thereby preferably placed in or near the control devices associated with the respective software.

In addition to the receipt of this identifying information on a component, it can also be of interest to explicitly determine that certain components are currently not integrated into the vehicle system. It is therefore envisioned in the first embodiment of the procedure that after the run-up of the control device, the central control device receives identifying data from other components connected directly or indirectly via data links with the central control device and, in the event of the omission of the reception of identifying data of a component, thereupon infers that this component is not present and loads parts of the software suitable for the operation of the vehicle without that component from a data memory into an operational data memory.

It is advantageous in both cases if the central control device loads the parts of the software for the operation of the vehicle using the available component(s) from a central data memory, since new data sets for the operation of the vehicle can be loaded into this central data memory. It is thus possible, for example, to store the newest software in the context of an otherwise necessary inspection of the vehicle, not only for the current control devices, components and aggregates in or on the vehicle, but also software to operate all other components available at this point in time or authorized by the manufacturer. In this way, the vehicle always has almost the latest data and a visit to a workshop for the operation of new components is then needed at most only if no inspection has been performed since its release and the data are not deposited somewhere else, for example, in the control device to be upgraded.

A central data memory offers the possibility of caring for a large part of the overall software possible being applied in the vehicle using a simple and optionally variable library that is structured with a good overview so that it is easily diagnosable.

It is also possible, however, and more probable in practice, that at least parts of that software, which has been loaded into the operational data memory, is stored in a decentralized manner and deposited in the respective individual control devices. This offers the advantage that merely by way of connecting a new component the current operating software is available by way of the software parts deposited in the control device of the component.

Naturally, a combination of a central data memory and local, individual components of associated data memories is also possible. Thus, for example, it is possible and makes sense for the data memory to be designed as a permanent software part library from which the needed software parts can be loaded quickly and with a visible structure into the operational data memory. Furthermore, it makes sense for the individual components to incorporate, at least in part, their own local data memories for the currently needed software. During an initial assembly of the aggregate, the associated software can then be transmitted from the local to the central data memory, thereby making any otherwise required external and manual transmission of the data superfluous.

Despite all the advantages of the previously described procedure, it can occur because of the variety of built-in components in a vehicle that the acquisition and loading of associated software can result in a delay in the operational readiness of a vehicle. This is not critical for many vehicles, such as highway department vehicles, since a few seconds does not mean anything. However, for fire trucks, for example, such a delay would hardly be justifiable.

Since even in vehicles in which reconfigurations frequently occur, the overwhelming number of starting procedures are performed with an unchanged configuration, the time span until complete operational readiness of the vehicle can be shortened in regular cases when it is provided in another version of the procedure of the invention that the central control device writes information into a configuration storage area about which components are built-in and that the central control device reads this memory area after a run-up of the control device and then assumes a presence there of the listed components.

In the simplest case, only a list with the identifying signals of the previously recognized components is stored. It is, however, also possible to store at least the identifying signals of the transferred software and, if necessary, their hierarchal relationships to each other because, in this way, the last active software configuration can be directly reconstructed without or with only slight calculation effort.

Finally, it is also possible for the central control device to write in a configuration memory area the software parts needed for the recognized configuration in an executable or in any event a rapidly compilable or decompressable form and to then read this memory area after a run-up of the control device and assume the presence of the components associated with the software parts. The determined software configuration can thereby be stored wholly or at least in its essential parts such that it can be reloaded without or with only a slight computation effort, and can thus be made available again in the shortest possible time.

It is envisioned in another variation of the procedure of the invention that the central control unit also writes data in a configuration memory area about which components have been recognized at least once and then after a run-up of the control device reads this memory area and assumes the presence of the components listed there.

The difference from the previous description consists in a component being viewed as present in this version of the procedure if it has been recognized once at least some time in the past and at least one single time. In this manner, the total system assumed to be present grows with each component while, in the previously described basic embodiment of the procedure, information is stored regarding which configuration was actually present during the last operation.

To be sure, the central control system also assumes the presence of all components that were present during the last writing in the configuration memory area. However, if it turns out that individual components are not present, the central control device during a renewed writing of the information in the configuration memory area stores the now recognized configuration as correct. According to this further improvement, the system stored in the configuration memory area grows with each new attached component. This facilitates maintaining as stable a system as possible in many cases, since upon the removal of a component it frequently cannot be determined or can be determined only with great difficulty, whether the parts of the software implemented originally with this component are actually used only for this one component. Certain software components are frequently used by different hardware components or for their control, for which reason a de-installation of all software parts installed with a new component would result in an unstable system in many cases.

In cases in which there has been a reconfiguration of the vehicle since the last run-up of the control device, however, it can also be provided that the central control unit, in the absence of the receipt of information identifying a component that is listed as present in the configuration memory area or whose associated software part is stored there, can erase or change this entry or the software part there such that the component is not considered to be present, in so far as the previously described problems are not relevant for this case or can be tolerated. As an alternative, only a certain recognition or a certain part of the applicable software can be erased and, if necessary, certain parameters of other software parts adapted.

As an alternative or as an addition, especially in cases in which an unstable overall system is to be feared after the changes, a complete new construction of the system can also be undertaken with a circumvention of the stored data. Preferably this can be done such that the possibility exists that an automatic routine or an operator resets the configuration memory to an initial condition.

Since during upgrades or reconfigurations of the vehicle the batteries are often separated from the onboard electrical network for safety reasons, it is envisioned in other embodiments of the invention that the configuration memory area is permanent. In particular, the configuration memory area can find itself in an EEPROM state, since this can be achieved inexpensively.

Finally, the procedure of the invention can be especially simple and safely implemented if the central control device incorporates a data link with at least one other component via a bus system which can in particular be a CAN bus.

It is noted that the previously described procedure is especially advantageous in vehicles which often or even regularly are reconfigured. However, the advantages of this procedure can also be used in vehicles that are reconfigured only occasionally or in exceptional cases. Even if this is supposed to occur in a workshop, which basically has the possibility after a successful reconfiguration of recording a special software optimized for the new configuration, it is still advantageous if this work step can be omitted and only occurs automatically. In addition, a vehicle making use of the inventive procedure is able, even with the failure of a component, to determine a software configuration that is optimally tuned to the now available components within the shortest time and without external intervention.

The central control device can advantageously be combined with an available control device, for example a motor control device, because of the relatively high computing power needed only for a short time. The central control device can in particular be an integral component part of one or several other control devices that are used in the normal driving of the vehicle mainly for other purposes since, in this manner, the provision of a separate and costly special control device can be omitted.

For example, integration into control devices makes sense, whose functions directly after the activation of ignition can be dispensed with since, during normal driving of the vehicle, they serve at least mainly for control, regulation or the monitoring of driving dynamic values. For example, vehicles that are parked can dispense with the calculation of data for the ABS system, the anti-slippage control, a sleep alarm, an obstacle warning system, a following control and separation control system and the like upon turning on the ignition, functions that make sense to use only during normal driving, in favor of the performance of the procedure of the invention.

Another advantage of this procedure consists in error reporting only being generated and/or stored and/or processed for components that are considered to be present according to the procedure of the invention. Since a large number of error reports can normally be generated during frequent changes of components, this significantly eases searching for the cause upon the appearance of an actual error.

Of particular significance is the use of the procedure of the invention for the vehicle-internal, component-related administration of its software, as well as the control and regulation of components of vehicle drivetrains and vehicle infotainment components, namely providing the driver with audio, video and navigation information. It is thus envisioned that with the procedure of the invention a changing component arrangement and/or functional arrangement of a vehicle drivetrain or infotainment system can be monitored and, in that regard, control and/or regulation software modules can be used and/or adapted or deactivated.

BRIEF DESCRIPTION OF THE DRAWING

The invention will now be described, by way of example, with reference to the accompanying drawing in which.

DETAILED DESCRIPTION OF THE INVENTION

Figure 1:
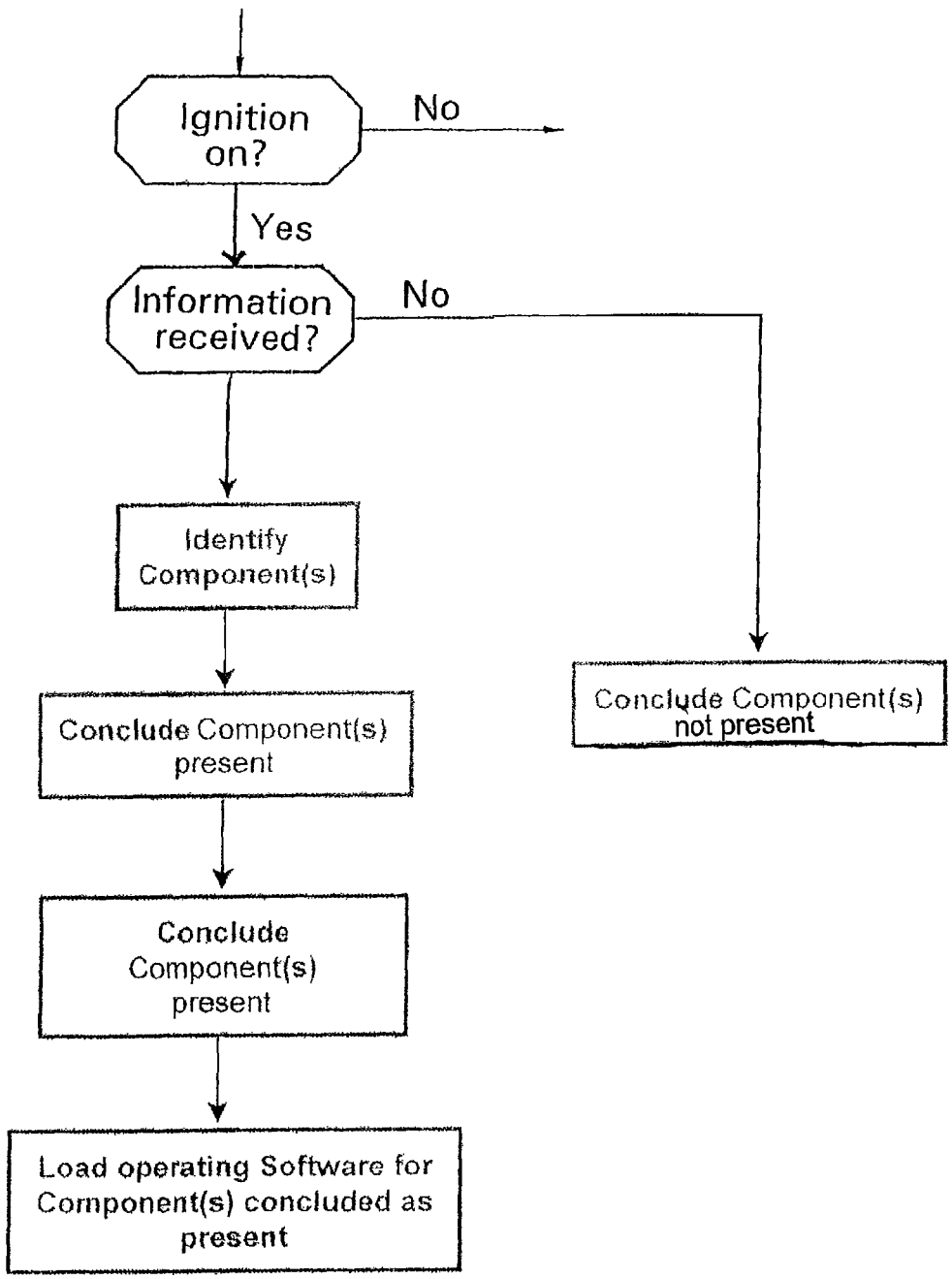
FIG. 1 is a flow chart of the procedure without storing the recognized configuration in a configuration memory area.

FIG. 1 assumes a truck is involved, which uses a procedure of the invention without storing the recognized configuration in a configuration memory area.

After turning on the vehicle ignition (sequential step: ignition on) and a run-up of the control device, there occurs a recognition of the vehicle configuration to the extent that the input information of the various components connected to each other and with the central control device, via a CAN, bus is evaluated. If the identifying information of certain components can be successfully read (sequential step: information present), it can be determined that these components are built into the vehicle network and are released for use (sequential step: components present). Accordingly, it is assumed that components are not built into the vehicle network or released if the appropriate information, for example the CAN bus messages or CAN bus signals, could not be read by the central control device (sequential step: components not present).

It is assumed here that the run-up of the central control device occurs immediately after, or as quickly as possible after, turning on the ignition of the vehicle. In this case, the adaptive configuration recognition occurs after the turning on of the ignition in that the central control device assumes that a component or function is not present in the vehicle until relevant information regarding it has been successfully read.

The concept of relevant information should, naturally, not only be understood as a transmission from a component, for example a control device, concerning its recognition but also, if necessary, whether that component is defective or not available. Relevant, identifying information which results in an integration or release of appropriate software or parameters should, moreover, allow the expectation as far as possible of greater certainty of the operational readiness of the components or their technical functions after a successful completion of the procedure.

After completion of the determination of the components and, if necessary, the functions to be integrated, a software configuration can then easily be selected, e.g., by the central control device or those distributed in a decentralized manner, which includes all detected components and functions and can optimally be tuned to the current configuration of the vehicle. However, since this process can under certain circumstances take a few seconds, and during that time the vehicle is not operationally ready or is ready only to a limited degree, a further development, according to FIG. 2, envisions that the adaptive configuration recognition is equipped with a configuration memory or with a configuration memory area.

Figure 2:
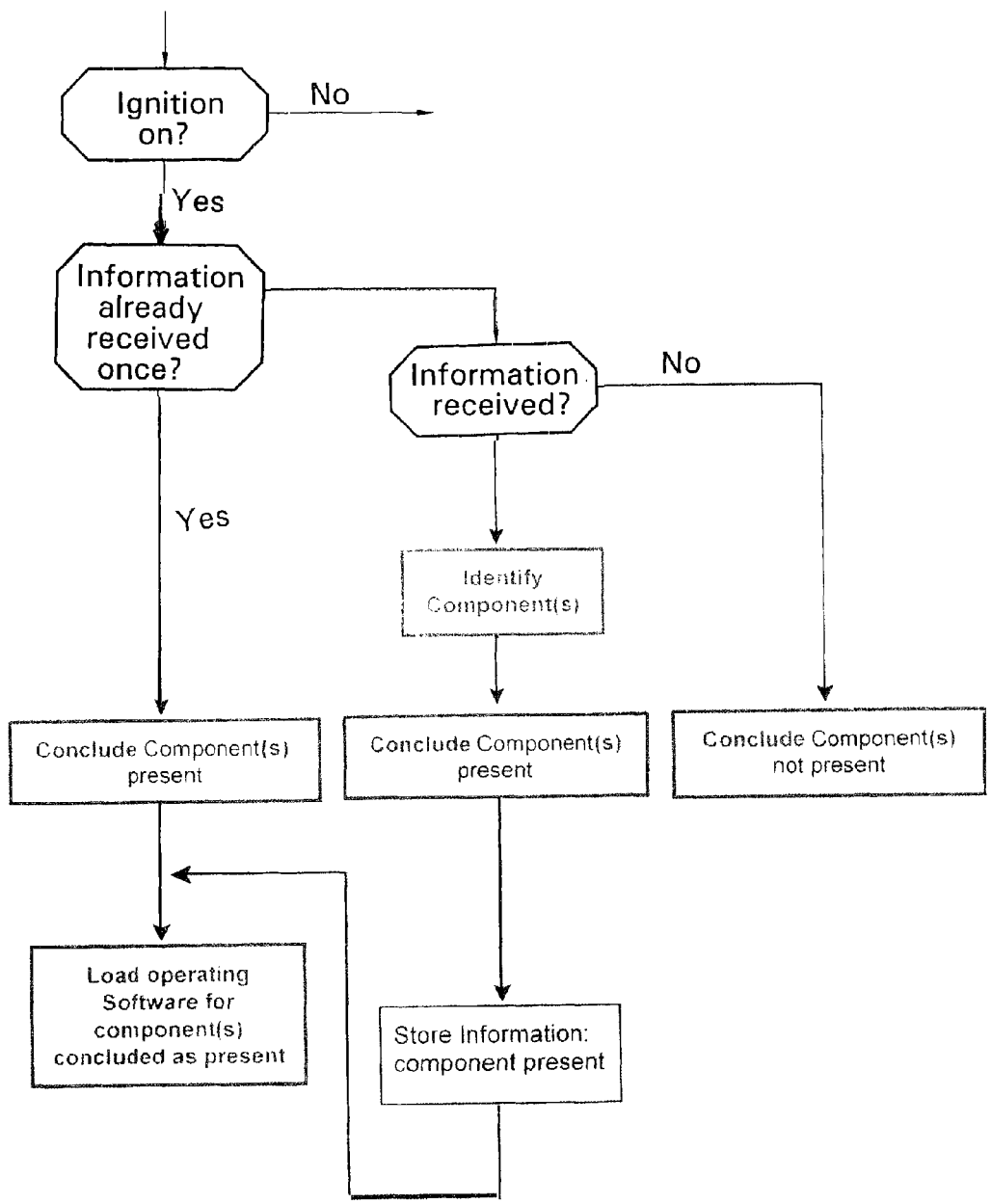
FIG. 2 is a flow chart of the procedure with storage of the recognized configuration in a configuration memory area.

In this case after the turning on of the ignition (sequential step: ignition on), the central control device temporarily assumes, according to the flow chart of FIG. 2, that a component or function is not present in the vehicle until relevant information is read at least once (sequential step: information already received once+sequential step: component present). In the process the last used configuration is deposited in the configuration memory area and includes all information that is received at least one time before the actual running of the program and is deposited in the configuration memory area.

In so far as the relevant information identifying the additional components has not yet been received and its receipt is not yet stored, the procedure of FIG. 2 follows the above described procedural steps of the flow chart of FIG. 1 (right side of the flow chart of FIG. 2), wherein a first time reception of the relevant information occurring in this cycle is stored (sequential step: store information: component present) or the determination is made that this component is not present (sequential step: component not present).

In the simplest case, the named storage in the configuration memory area can occur in the form of a list of previously recognized components. Even upon the first successful reading of the information about a component or function identifying the respective component, these data can be directly stored in the configuration memory area, whereupon it is immediately available in its original form.

In many cases, however, it makes sense that if, as an alternative or supplement, the appropriate parts of the software and, if necessary, their linkage to each other are stored in a configuration memory bank, since the corresponding computation effort for a new, but identical software composition, can at least be kept low. In addition, it is also possible and makes sense as an alternative or supplement for vehicles which are only reconfigured rarely to store the last determined and complete software system, whereby this is available in the shortest possible time and the time period for complete operational readiness of the vehicle can be shortened.

This program sequence can also be used for the purpose that an error recognition for those components or functions is set aside until a determination can be successfully made which components or functions are present and activated in the vehicle network. It can thereby be assured that no error messages about components or functions in the vehicle network that are not present will be made or generated by it.

In addition, it also makes sense when using a configuration memory area that upon servicing, resetting or erasing of the stored configuration is possible in order, for example, during a subsequent removal of components or upon the deactivation of a function, to also deactivate these in the configuration memory area. It is thereby ensured that no error reports pertaining to the disassembled components or deactivated functions accumulate.

The mentioned resetting can occur automatically or also manually by way of a diagnostic routine. It is, however, also possible to remove only the corresponding components or functions from the configuration memory areas instead of a resetting or erasing of them from it. However, this appears to make sense only in exceptional cases since, in this manner, an increasingly unstable overall software system could arise as a result of repeated additions and erasures of various components and functions.

The use of the configuration memory system or the procedural sequence, according to FIG. 2, will be clarified by way of another example.

Assumed is a vehicle which, at the time of its manufacture at the end of the production line, has no built-in hub drive. The information "hub drive built in"—represented by an appropriate CAN message—cannot be read after activation of the ignition, since it was neither stored in the configuration memory area nor can it be actively transmitted by a hub drive. Later, a subsequent hub drive with an appropriate control device will be installed by a construction manufacturer. After the initial activation of the ignition following this change of configuration, the relevant information "hub drive present" represented by a CAN message is made available, read by the central control device, and then finally is stored in the configuration memory area.

In each following program sequence, namely very quickly after each activation of the ignition, the information "hub drive present" is then available for the configuration memory area so that any longer lasting query of the control device of the hub-drive can be omitted.

If the hub-drive is again removed, it is sufficient for the shop, the driver or even an automatic function to reset the configuration memory area. In this way, it is ensured that no error reports regarding the absence of a hub-drive will be generated and an automatic optimal configuration of the software for the new hardware configuration is easily possible.

The invention claimed is:

1. A method of adaptive recognition and configuration of software for controlling components of a motor vehicle, the motor vehicle having at least one central control device connected via a data link to at least one data memory where software to operate the at least one central control device is securely stored and to at least one additional component of the motor vehicle which was not present during an immediately previous operation of the motor vehicle, the method comprising the steps of:

activating ignition of the motor vehicle and startup of the control device;

upon startup of the control device, reading from a configuration memory area of the central control device component configuration information previously stored in the configuration memory area identifying components of the motor vehicle that were present during the immediately previous operation of the motor vehicle;

determining the software for controlling components of the motor vehicle by assuming that each of the components identified by the stored component configuration information as present on the vehicle during the immediately previous operation of the motor vehicle is currently present on the vehicle; and loading software for controlling the components of the motor vehicle identified by the stored component configuration information as present on the vehicle during the immediately previous operation of the motor vehicle from a data memory into an operational data memory;

receiving in the central control device and from the at least one additional component at least one component identification identifying the at least one additional component connected to the central control device by the data link;

loading software for controlling the at least one additional component not present during the immediately previous operation of the motor vehicle from a data memory into an operational data memory;

writing into the stored component configuration information in the configuration memory area the component identification information identifying the at least one additional component; and controlling the motor vehicle based upon the loaded software.

2. The method according to claim 1, further comprising the step of receiving in the central control device and in addition to the component identification information received from the at least one other additional component, component identification information identifying the components connected to the central control device by the data link at the startup of the control device, and upon failing to receive component identification information identifying a component identified by the stored component configuration information as present during the immediately previous operation of the motor vehicle, concluding that the component for which component identification information is not received is not currently present on the vehicle, and loading the software for controlling the components of the motor vehicle from the data memory into the operational data memory wherein the software for controlling the components of the motor vehicle includes:

software for controlling the components identified by the stored component configuration information as present on the vehicle during the immediately previous operation of the vehicle and for which component identification information was received upon startup of the control device, and software for controlling the at least one additional component not present during the immediately previous operation of the motor vehicle.

3. The method according to claim 2, further comprising the step of one of erasing and changing the component configuration information stored in the configuration memory area to reflect a failure to receive component identification information identifying a-component identified by the stored component configuration information as present during the immediately previous operation of the motor vehicle and that the component for which component identification information is not received is not currently present on the vehicle.

4. The method according to claim 3, further comprising the step of one of automatically or manually resetting and erasing the configuration memory area.

5. The method according to claim 1, further comprising the step of writing component identification information into the component configuration information stored in the configuration memory area for each of the at least one additional component that is recognized at least once.

6. The method according to claim 1, further comprising the step of operating the configuration memory area with a retentive memory.

7. The method according to claim 1, further comprising the step of operating the configuration memory area with storage in an EEPROM.

8. The method according to claim 1, further comprising the step of enabling the central control device to use a data bus connection for a data link with one of the at least one other component and a component control device associated with one of the at least one other component.

9. The method according to claim 8, further comprising the step of operating the data bus connection as a CAN bus.

10. The method according to claim 1, further comprising the step of operating the central control device as an integral component of at least one other control device which are used primarily for other purposes in a drive operation of the vehicle.

11. The method according to claim 10, further comprising the step of using the at least one other control device, during driving operation of a vehicle, which is used at least primarily for one of control, regulation and monitoring of driving dynamic values.

12. The method according to claim 1, further comprising the step of at least one of generating, storing and further processing error reports only for the at least one additional component considered present by one of the previous steps.

13. The method according to claim 1, further comprising the step of at least one of using, adapting and deactivating at least one of a changing component arrangement and a functional arrangement of one of a vehicle drive train, an infotainment system, control software modules and regulation software modules.

14. A method of adaptive recognition and configuration of software for controlling components of a motor vehicle which has at least one central control device connected via a data link to at least one data memory where software to operate the at least one control device is securely stored and to components of the motor vehicle to operate the at least one central control device, is stored, the method comprising the steps of:
    turning on an ignition of the motor vehicle and startup of the control device;
    upon startup of the control device and by operation of the control device;
    initially reading a component configuration list that was previously stored in a configuration memory area the component configuration list identifying components that were previously recognized as being operational during an immediately previous operation of the motor vehicle;
    assuming that each one of the components that are identified in the component configuration list were previously recognized as being operational during the previous operation of the vehicle and are currently present in motor vehicle;
    loading software, suitable for operating the vehicle and the components identified in the component configuration list from the data memory into an operational data memory;
    subsequently receiving from components currently operational in the vehicle operational component identifying information identifying the components that are currently operational in the vehicle and connected to the central control device by the data link;
    concluding that each of the components identified in the vehicle operational component identifying information is present on the vehicle;
    updating the software loaded into the operational data memory based upon the components identified in the vehicle operational component identifying information; and
    writing the vehicle operational component identifying information into the component configuration list stored in the configuration memory area for use in a subsequent start up of the vehicle.

15. The method according to claim 14 further comprising the steps of updating the list of previously recognized components based upon the identified components; and
    loading software, suitable for operation of the vehicle having the components listed in the updated list of components, from the data memory into the operational data memory.

* * * * *